(12) United States Patent
Grenfell (10) Patent No.: US 8,736,605 B2
(45) Date of Patent: May 27, 2014

(54) METHOD AND APPARATUS FOR CONSTRAINT-BASED TEXTURE GENERATION

(71) Applicant: Adobe Systems Incorporated, San Jose, CA (US)

(72) Inventor: Desmond Grenfell, Lancashire (GB)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/034,701

(22) Filed: Sep. 24, 2013

(65) Prior Publication Data

US 2014/0063007 A1 Mar. 6, 2014

Related U.S. Application Data

(63) Continuation of application No. 11/124,552, filed on May 6, 2005, now abandoned.

(51) Int. Cl.
*G06T 15/00* (2011.01)

(52) U.S. Cl.
USPC .......................................... 345/419; 345/423

(58) Field of Classification Search
CPC ........................................................ G06T 15/04
USPC .......................................... 345/419, 582, 423
See application file for complete search history.

(56) References Cited

U.S. PATENT DOCUMENTS

| | | | |
|---|---|---|---|
| 5,204,944 A | 4/1993 | Wolberg et al. | |
| 5,333,245 A | 7/1994 | Vecchione | |
| 5,504,845 A | 4/1996 | Vecchione | |
| 5,878,174 A | 3/1999 | Stewart et al. | |
| 5,898,438 A | 4/1999 | Stewart et al. | |
| 5,982,378 A | 11/1999 | Kato | |
| 6,256,038 B1 | 7/2001 | Krishnamurthy | |
| 6,300,958 B1 | 10/2001 | Mallet | |
| 6,518,963 B1 | 2/2003 | Waupotitsch et al. | |
| 7,386,429 B1 | 6/2008 | Fujisaki | |
| 2003/0160785 A1 | 8/2003 | Baumberg | |
| 2003/0161014 A1 | 8/2003 | Tobita et al. | |
| 2003/0169812 A1 | 9/2003 | Maziere et al. | |
| 2003/0206177 A1 | 11/2003 | Hoppe et al. | |
| 2005/0128210 A1 | 6/2005 | Berger | |
| 2005/0197731 A1 | 9/2005 | Ahn et al. | |

OTHER PUBLICATIONS

Sander, et al., "Signal-Specialized Parametrization", Eurographics Workshop on Rendering 2002, 87-100.

*Primary Examiner* — Maurice L McDowell, Jr.
(74) *Attorney, Agent, or Firm* — Finch & Maloney PLLC (57) ABSTRACT

The present disclosure includes systems and techniques relating to texture mapping a surface. In general, the subject matter described in this specification can be embodied in a computer-implemented method that includes defining a triangular mesh model of the surface; identifying at least one user-specified texture underfold constraint; computing a weighted energy functional for the triangular mesh, the weighted energy functional comprising a plurality of nodal texture values from which the triangular mesh is specified, the nodal texture values computed in accordance with the at least one user-specified texture underfold constraint; and iteratively recomputing the nodal texture values to converge the weighted energy functional toward a minimum value. The subject matter described in this specification can also be embodied in various corresponding computer program products, apparatus, and systems.

20 Claims, 7 Drawing Sheets
(5 of 7 Drawing Sheet(s) Filed in Color)

METHOD AND APPARATUS FOR CONSTRAINT-BASED TEXTURE GENERATION

This application is a continuation of U.S. patent application Ser. No. 11/124,552 (filed 6 May 2005), the entire contents of which is hereby incorporated by reference herein.

FIELD OF THE INVENTION

The present invention relates generally to computer graphics, and more particular to a methodology for creating high-quality texture maps for photographic re-texturing.

BACKGROUND OF THE INVENTION

In the field of computer graphics and computer graphics rendering software, it is often desirable to apply a texture to a graphical image of a digitally-rendered object. Such functionality is often referred to as "texture mapping" or "texturing," and numerous software tools for performing this function are known to those of ordinary skill in the art.

As a general proposition, it is more difficult to map a photo-realistic texture to an object whose surface geometry and topology is complex than to an object whose surface is comparatively simple, for example, essentially planar. The measure of this complexity increases as the desired degree of photorealism increases.

The generation of a texture map for a graphical image is complicated further when the surface to be mapped includes such features as underfolds, where the continuous surface folds beneath and partially obscures itself, and discontinuities. Examples of surfaces which have such features include clothing and upholstery.

SUMMARY OF THE INVENTION

In view of the foregoing and other considerations, the present invention is directed to a methodology for creating a high-quality texture map for photographic retexturing of an object such as an actual surface of a three-dimensional (3D) computer model or the projected surface within a two-dimensional (2D) image such as a photograph.

In one aspect, the invention solves an existing problem using a new technique which allows the solution to be applied to a wide range of situations in a cost-effective manner. One feature of the invention is that in practice it demands only modest technical skills of a type found commonly in the graphics design industry.

In one embodiment, the invention consists of a mathematical technique, and an associated software implementation thereof, for determining the most visually realistic distribution of texture over a specified surface. As used herein, the term "surface" may be used to refer either to an actual surface within a 3D computer model, or the projection of a physical surface within a 2D image such as a photograph. When used in conjunction with suitable rendering software, the calculated texture distribution allows regions of the treated image to be re-textured in a highly realistic way such that the casual viewer would imagine that the applied texture was present on the object when it was photographed or otherwise created.

In accordance with one aspect, the invention consists of the application of specific mathematical and computer software techniques to the problem of realistically re-texturing regions of 3D models or 2D images or photographs. The invention provides the ability to specify general constraints and hints in the form of free-form lines which are drawn over the surface to be re-textured. The invention then finds the texture distribution which optimally meets these constraints and hints whilst minimizing the overall stretching and compression of the fabric.

Advantageously, this combination of user-specified constraints and physics-based constraints allows the invention to be used to generate visually realistic texture distributions with a minimum of skill and effort. In addition, the invention enables a wide range of visually important features to be replicated in order to enhance the realism of the final effect. These features include:

Direction of texture flow
Under-folds
Seams and other texture breaks
Ridges, folds and edge horizons
General profiles The nature of the invention is such that the authoring process (i.e., the entire process of generating a good texture distribution) can be performed incrementally. This advantageously enables existing texture distributions to be improved at a later date to meet higher standards of realism.

It is contemplated that the invention has various commercial applications, including on-line sales and marketing of products for which texture and shape are important purchasing considerations. In addition, the invention may be applied in support of product design and design modification of products for which texture and shape are important design considerations. The invention facilitates the general communication of specifications and appearance of commercial products.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing and other features and aspects of the subject invention will be best understood with reference to a detailed description of specific embodiments of the invention, which follow, when read in conjunction with the accompanying drawings, wherein.

DETAILED DESCRIPTION OF SPECIFIC EMBODIMENTS OF THE INVENTION

The disclosure that follows, in the interest of clarity, does not describe all features of actual implementations. It will be appreciated that in the development of any such actual implementation, as in any such project, numerous engineering and programming decisions must be made to achieve the developers' specific goals and subgoals (e.g., compliance with system- and business-related constraints), which will vary from one implementation to another. Moreover, attention will necessarily be paid to proper engineering practices for the environment in question. It will be appreciated that such a development effort might be complex and time-consuming, but would nevertheless be a routine undertaking for those of ordinary skill in the relevant fields.

The Mathematical Technique

The core mathematical technique in accordance with one embodiment of the invention is a form of constrained optimization in which two types of constraint are considered: (1) user-specified or explicit constraints and hints; and (2) physics-based or implicit constraints.

In one embodiment, the user-specified constraints and hints are expressed by drawing free form lines onto the surface to be re-textured. These lines enable the user to specify that the texture should flow in a particular direction or that the texture may be disjoint along the specified line.

The same type of free-form lines are used to add localized geometric details such as folds, under-folds, ridges, and valleys as perturbations to some underlying base geometry. When applied to 2D images and photographs (as opposed to fully 3D computer models), the underlying geometry will generally be modeled as something very simple (such as a plane) and the geometry lines may be used to add more extended geometric features such as edge profiles and curvatures.

The physics-based constraints are derived from a simple model of a perfectly elastic fabric in which the restoring force for a length of fabric is linearly proportional to the extension or compression of that length from its natural (or unextended) length. These constraints are applied without any user intervention in order to maintain a texture distribution which is visually convincing in the context of the user-specified constraints and geometry.

As a starting point, a triangular mesh which covers the surface to be re-textured is created. Those of ordinary skill in the art will appreciate that triangular mesh models are a common methodology for performing texture mapping, and various computer-based tools for creating triangular mesh models are known in the prior art. The mesh allows a continuous texture distribution to be specified as a linear interpolation of texture values at the triangle vertices or nodes. User-drawn lines which specify texture directions or discontinuities are preserved as edges within the triangular mesh. Nodes which lie on a texture discontinuity are duplicated and the nodal edges along the discontinuity are either left unconnected or else are connected by special "hidden" nodes and triangles. Hidden nodes and triangles are not used to generate the final texture map.

The triangular mesh is used to compute a weighted energy functional. The global value of this functional serves as a measure of how closely both the user-specified and physics-based constraints are met by a particular texture distribution. The set of nodal texture values which minimize this energy functional are considered to represent the optimum texture distribution. The weights for the energy contribution from hidden triangles are reduced using a simple heuristics based factor so that the user need not specify the extent of any hidden (i.e. under-folded) fabric with any great accuracy.

The value of the energy functional is cast in terms of the nodal texture values. The optimum texture distribution is then found by determining the set of nodal textures which simultaneously minimize this functional. This implies a large set of non-linear simultaneous equations. These equations are solved using an iterative Newton-Raphson technique which is recursively applied to each nodal texture value using the results of the previous iteration. The technique requires a reasonable starting texture distribution and this is initially set to a flat texture distribution whose direction and density are based on the surface geometry and imposed texture directions. Subsequently, the results of previous optimizations may be used as the starting distribution for a more refined solution.

Figure 1:
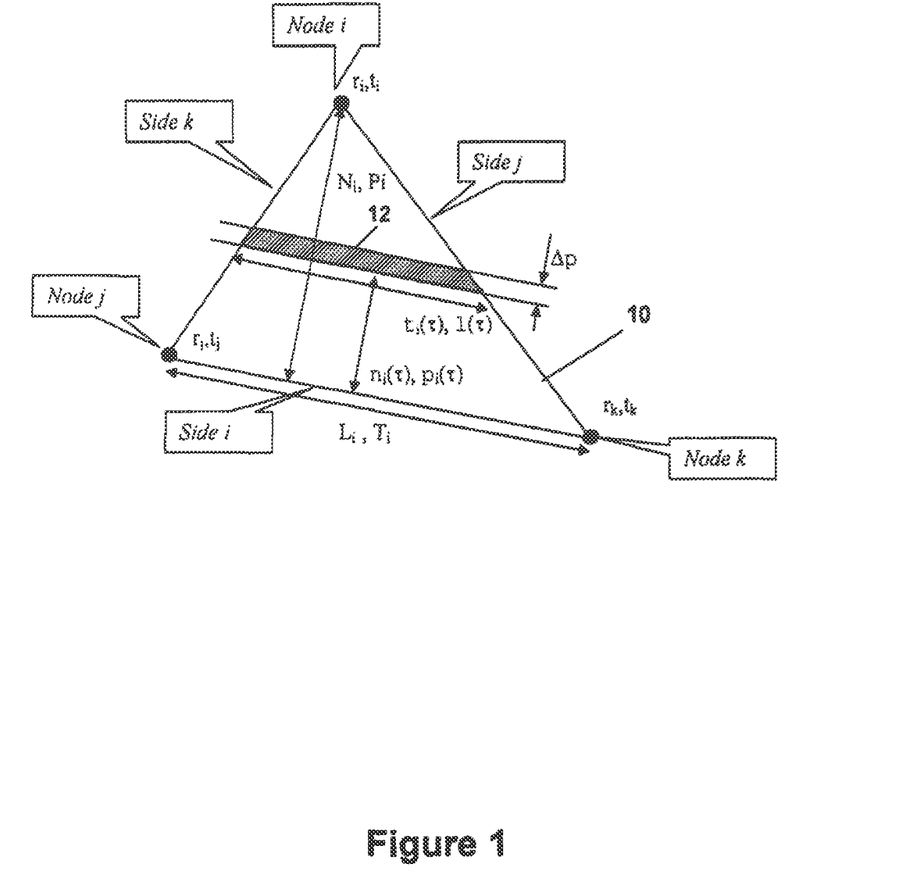
FIG. 1 depicts a representative triangle from a triangular mesh model of a three-dimensional surface.

The process for computing the energy functional is described with reference to FIG. 1, which shows an arbitrary triangle 10 within the connected triangular mesh comprising a model of a surface. The nodes and sides of the triangle can be labeled i, j, and k, as shown in FIG. 1.

The position of each node i, j, and k are $r_i$, $r_j$ and $r_k$ respectively with $r_i$ having components ($r_{ix}$, $r_{iy}$, $r_{iz}$), $r_j$ having components ($r_{jx}$, $r_{jy}$, $r_{jz}$), and with $r_k$ having components ($r_{kx}$, $r_{ky}$, $r_{kz}$). The texture coordinate of each node is designated by $t_i$, $t_j$ and $t_k$ where each texture coordinate t has components ($t_u$, $t_v$), The physical length of the sides i, j, and k of triangle 10 are designated $L_i$, $L_j$, and $L_k$, respectively, where side i is the side opposite node i, side j is the side opposite node j, and side k is the side opposite node k. The physical length of each perpendicular, i.e. the perpendicular distance from node i to side i, or from node j to side j, or from node k to side k is designated $N_i$, $N_j$, and $N_k$, respectively.

A texture length value is defined for each side i, j, and k, and is designated $T_i$, $T_j$, and $T_k$, respectively. Similarly, a texture length value is defined for each perpendicular, and is designated as $P_i$, $P_j$, and $P_k$, respectively.

As would be appreciated by those of ordinary skill in the art, the process of texture mapping can be likened to covering the modeled surface with a "fabric." In the presently disclosed embodiment, this "fabric" is assumed to be an isotropic, perfectly elastic material with and elastic modulus $\epsilon$ (in units of force/distance). The (longitudinal) spring constant for a strip of such a membrane, such as the strip designated with reference numeral 12 in FIG. 1, having unextended length t and width $\Delta p$ is given by $$\text{Spring constant} = \epsilon \Delta p / t$$

and the restoring force when such a strip is stretched will be given by $$\Delta F = \epsilon \Delta p (l - t)/t$$

where t=the relaxed or un-extended length and I=the extended length

Similarly, the energy contained within the extended strip is given by $$\Delta E = \tfrac{1}{2} \epsilon \Delta p (I-t)^2 / t$$

Considering the total energy of all such strips which run parallel to side i of triangle 10, a variable τ is defined which varies from 0 at side i to 1 at node i. The parameters defining our strip can then be expressed as a function of τ as:

$$I = \tau L$$

$$t = \tau T$$

$$\Delta p = P \Delta \tau$$

resulting in the following expression for the energy in a general strip at τ, Δτ parallel to side i $$\Delta E_i^x = \tfrac{1}{2} \epsilon (P_i/T_i)(L_i - T_i)^2 \tau^2 \Delta \tau$$

Letting Δτ approach 0 an expression for the total strain energy E within all the strips parallel to side I of triangle 10 is as follows:

$$E_i^x \tfrac{1}{2} \epsilon (P_i/T_i)(L_i - T_i)^2 \int \tau^2 d\tau \text{ for } \tau = [0,1]$$

This yields $$E_i^x = (\tfrac{1}{6}) \epsilon (P_i/T_i)(L_i - T_i)^2$$

Or in appropriate units $$E_i^x = (P_i/T_i)(L_i - T_i)^2$$

A similar analysis to determine the total strain energy contained in all strips which run perpendicular to side i yields the following result $$E_i^y = (T_i/P_i)(N_i - P_i)^2$$

The total strain energy contained within the triangle is thus given by $$E = E_i^x + E_i^y$$

However the total strain energy E of triangle 10 must be invariant to both the choice of x and y and indeed the choice of side. This implies that $$E_i^x = E \cos \theta$$

and $$E_i^y = E \sin \theta$$

where θ is the angle that side i makes with the chosen x axis.

Furthermore, by demanding that E be independent of our choice of side it can be deduced that the total strain energy of the triangle must be given by $$E = E_i^{xi} + E_j^{xj} + E_k^{xk}$$

where $x_i$ runs parallel to side i, $x_j$ run parallel to side j and $x_k$ runs parallel to side k.

Alternatively, using the earlier result and cycling i, j, and k, $$E = (P_i/T_i)(L_i - T_i)^2 + (P_j/T_j)(L_j - T_j)^2 + (P_k/T_k)(L_k - T_k)^2$$

Those of ordinary skill in the art will note that the physical lengths L of the sides are functions of the position coordinates $r_i$, $r_j$, and $r_k$, whilst the texture lengths of the sides i, j, and k, and the perpendiculars corresponding to each side are functions of the texture coordinates $t_i$, $t_j$, $t_k$ It will further be apparent to those of ordinary skill in the art that the energy for the entire mesh of triangles will be given by summing the above expression over all triangles. In the disclosed embodiment of the invention, it is then desired to compute the values of the t coordinates in this global expression which minimizes the total value of E for a given set of r coordinates. To accomplish this, and expression for the partial derivative of E with respect to each t component is derived, and each of these is simultaneously set to zero.

If the energy of triangle n is given by $E_n$ then the total energy is given by $$E_{total} = \Sigma E_n \text{ for all } n$$

and $$\partial E_{total}/\partial t_{xi} = \Sigma \partial E_n/\partial t_{xi} \text{ for all } n \text{ containing node } i$$

$$\partial E_{total}/\partial t_{yi} = \Sigma \partial E_n/\partial t_{yi} \text{ for all } n \text{ containing node } i$$

This yields a pair of simultaneous equations for each node i $$X_i(t_{xj}, t_{yj}) = 0$$

$$Y_i(t_{xj}, t_{yj}) = 0$$

where the functions $X_i$ and $Y_i$ are non-linear functions of the texture co-ordinates of all connected nodes j (including j=i).

It is to be noted that the constants contained within the functions $X_i$ and $Y_i$ will be set by the position co-ordinates of the triangular mesh.

To solve this (very large) system of non-linear equations, a local Newton-Raphson scheme is combined with a global under-relaxation scheme as follows:

(1) An initial flat texture distribution is set across the triangular mesh.
(2) While not converged:
  (a) Compute the values of $X_i$, $Y_i$ together with $\partial X_i/\partial t_{xi}$, $\partial Y_i/\partial t_{yi}$, $\partial X_i/\partial y_i$, $\partial Y_i/\partial t_{xi}$ for each node and use these to estimate the changes $\Delta t_{xi}$, $\Delta t_{yi}$ that would project $X_i$, $Y_i$ to zero assuming linear dependence on $t_{xi}$, $t_{yi}$ and no change to the texture co-ordinates of the connected nodes.
  (b) Having determined $\Delta t_{xi}$, $\Delta t_{yi}$ for all nodes in the mesh, increment the current values of $t_{xi}$, $t_{yi}$ by adding $\lambda \Delta t_{xi}$, $\lambda \Delta t_{yi}$ where λ is a number in the range (0,1) known as the under-relaxation factor.

This process is repeated iteratively until the solution approaches a steady-state. In one embodiment of the invention, a factor of 0.5 for λ is found to produce satisfactory convergence.

Convergence of the solution is monitored during the iteration and as the solution approaches a steady-state an adaptive subdivision process is applied to refine the underlying triangular mesh. The subdivision process is preferably based entirely on edge-based criteria to avoid the generation of any unwanted texture discontinuities and looks at both projected edge length and the change in simulated depth. The effect of the subdivision process is to generate a very high quality texture map both within the surface being authored and at its edges.

The Computer Program

As would be apparent to persons of ordinary skill in the art, the mathematical techniques described herein may be implemented within an existing computer program which provides a ready framework for creating the data structures required by the invention when used to generate texture maps for scanned 2D photographs. The existing program is also able to use the output of the invention to generate a very high quality rendering.

The input to the program in accordance with one embodiment of the invention is as follows:
(1) A high quality mask which defines the region of the image to be re-textured;
(2) A collection of free-form lines which are created by the user by sketching over the input image and which define geometry and texture features in the space of that input image; and
(3) Data associated with the feature lines including a variable width and height together with a selected cross-sectional profile.

In one embodiment, the computer program provides a graphical user interface for the creation and manipulation of this data. In particular, feature lines are preferably input as free form lines which are sketched in using a mouse, pen, or similar user input device as would be most familiar to those of ordinary skill in the art. These free form lines are then converted to cubic Bezier splines according to a suitable and preferably user-definable accuracy criterion. It is believed that this conversion would be a matter of routine to those of ordinary skill in the art, and that the details of performing such a conversion need not be described herein.

Having created a feature line, the user is able to progressively smooth the line and/or edit the individual points and tangents in the Bezier representation of the line.

As well as creating and editing feature lines, the computer program also preferably provides facilities for scaling and offsetting the resultant texture distribution so that it can be used in commercial applications which require the alignment and matching of separate components of an item of apparel or other textured item.

In the disclosed embodiment, features which are currently supported are:
Vertical or Horizontal texture flow—the specified texture axis is forced to flow parallel to the feature.
A purely geometric feature—a height profile is applied across the line. The width and height of this profile can be freely varied along the length of the line the shape of the profile is fixed for each feature.
Under-fold—the texture folds under resulting in a connected discontinuity. This feature is generally combined with an appropriate geometry profile. This feature implies that there is some hidden texture which connects both sides of the discontinuity and prevents the texture values from drifting too far apart.
An unconnected discontinuity—the texture is completely disconnected along the feature line. This would be used to represent a seam or cut in the item being modeled.

In operation of the program, a separate background thread takes the current data and seeks a texture distribution which is closest in a global sense to both the explicit constraints defined by the data and the constraints implied by a physics based model which attempts to minimize the stretching and compression of the texture. The texture distribution is defined as a linear interpolation of nodal texture values over a well connected triangular mesh which ensures that the texture is continuous at all points where it is required to be so.

Figure 2:
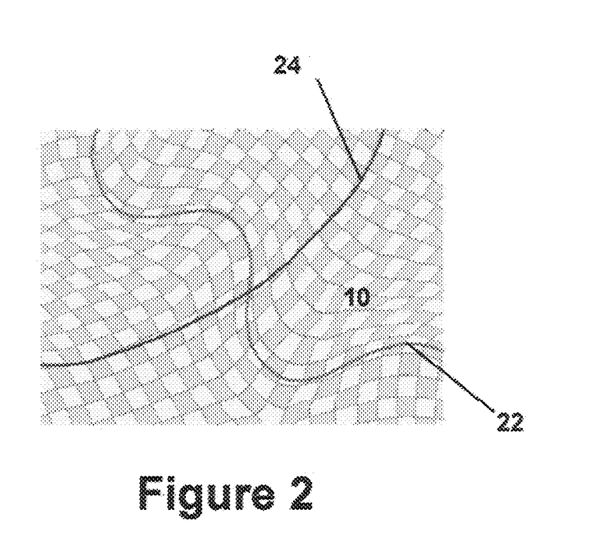
FIG. 2 depicts an exemplary texture distribution showing the distortion of a uniform grid pattern resulting from user-specified texture flow lines in accordance with one embodiment of the invention.

Turning to FIG. 2, there is shown one example of the results of a texture mapping operation performed in accordance with the currently disclosed embodiment of the invention. FIG. 2 Specifically, FIG. 2 illustrates the manner in which texture flow features are handled in accordance with one embodiment of the invention. In operation, a surface 20 is presented to the user, preferably on a computer display. Using a suitable user input device, such as a mouse, digitizing pad, or the like, the user specifies the desired texture flow. In the example of FIG. 2, the "texture" is a uniform grid of squares; FIG. 2 shows how this texture would appear after being mapped to the surface 20 in accordance with the presently disclosed embodiment based upon the user-specified constraints and the physical (strain energy) constraints.

In FIG. 2, a first user-specified line 22 indicates the desired texture flow in the horizontal direction, while a second line 24 specified by the user indicates the desired texture flow in the vertical direction. That is, line 22 forces the horizontal direction of the texture to run parallel to it, while line 24 does the same in the vertical texture direction. As discussed above, the constraint is applied by a localized energy function whose weight can be adjusted. The resultant appearance of the uniform grid of squares upon adjustment of the texture flow in accordance with the present invention is observable in FIG. 2.

Figure 3:
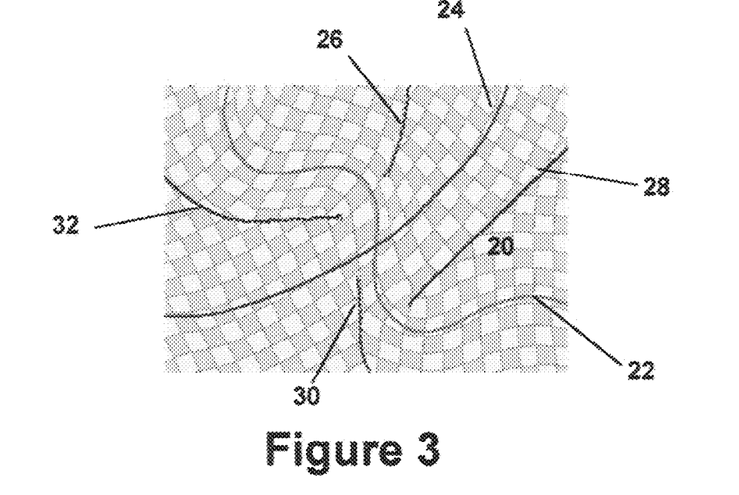
FIG. 3 depicts an exemplary texture distribution showing the distortion of a uniform grid pattern resulting from user-specified texture flow lines and texture discontinuity lines in accordance with one embodiment of the invention.

FIG. 3 illustrates how texture discontinuities are handled by the presently disclosed embodiment of the invention. In addition to the texture flow lines 22 and 24 specified by the user, in FIG. 3 the user has specified a number of texture discontinuities corresponding to dashed lines 26, 28, 30, and 32. The texture is allowed to be discontinuous across these lines, and this reduces the overall stretching and squashing of the texture. This is observed through comparison of the distortion of the grid pattern in FIG. 2 with the distortion of the grid pattern in FIG. 3.

Figure 4:
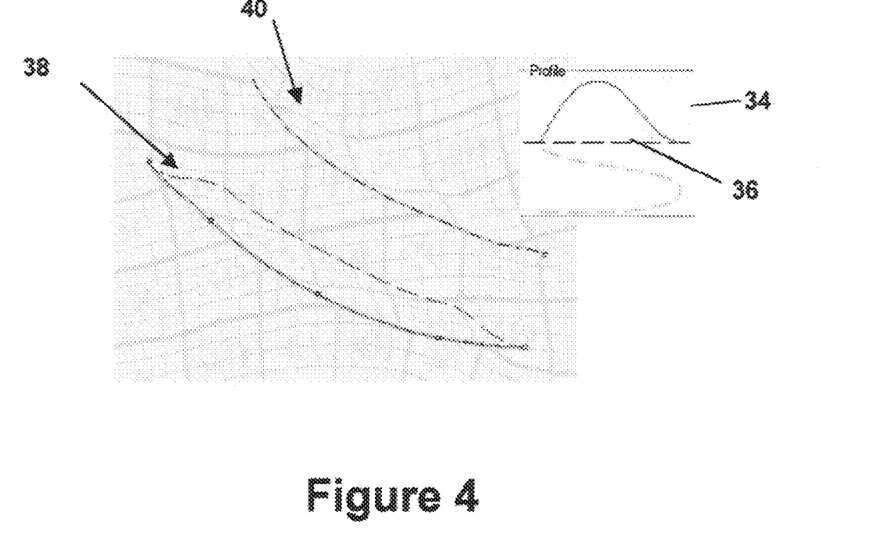
FIG. 4 depicts an exemplary texture distribution showing the distortion of a uniform grid pattern resulting from user-specified texture underfold lines in accordance with one embodiment of the invention.

FIG. 4 illustrates how the present invention handles situations involving texture underfold, i.e., where the surface is tucked under itself. In one embodiment, the user specifies the extent of an underfold in a profile window, where the profile of the texture intended to remain visible is specified by the solid line above a central horizontal axis 36, and the profile of the underfolded texture that will not be visible is specified by the dashed line below axis 36. Two such underfolds 38 and 40 are shown in FIG. 4. Once again, the resultant distortion of the uniform grid upon application of the underfold constraints is observable.

Figure 5:
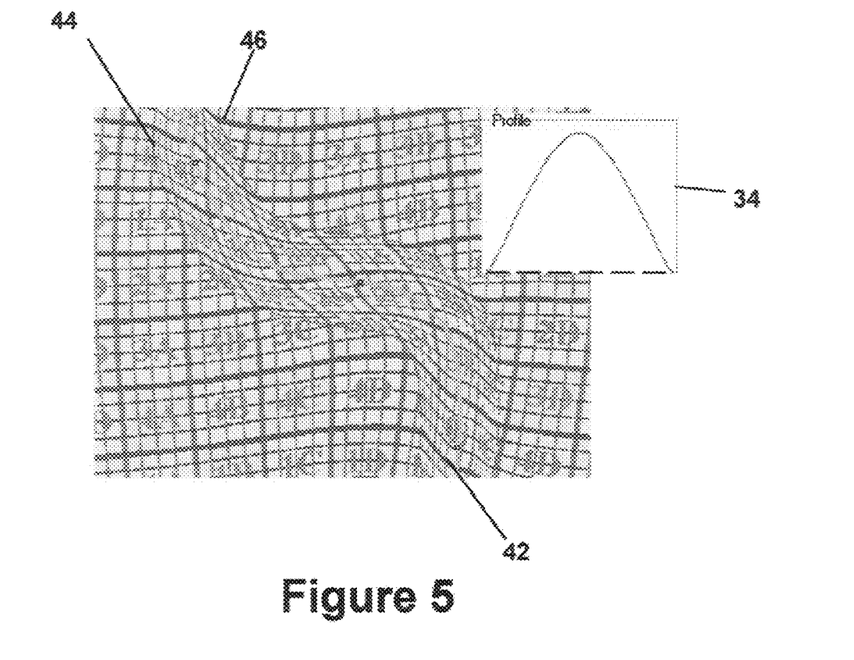
FIG. 5 depicts an exemplary texture distribution showing the distortion of a uniform grid pattern resulting from a user-specified texture depth profile in accordance with one embodiment of the invention.

FIG. 5 illustrates how a user can specify a texture depth profile. In FIG. 5, the user specifies the desired centerline 42 of a ridge having a profile as specified in profile window 34. In FIG. 5, the ridge is observable between dashed lines 44 and 46, and again, the distortion of the uniform grid after application of the specified depth constraints is observable.

Figure 6A:
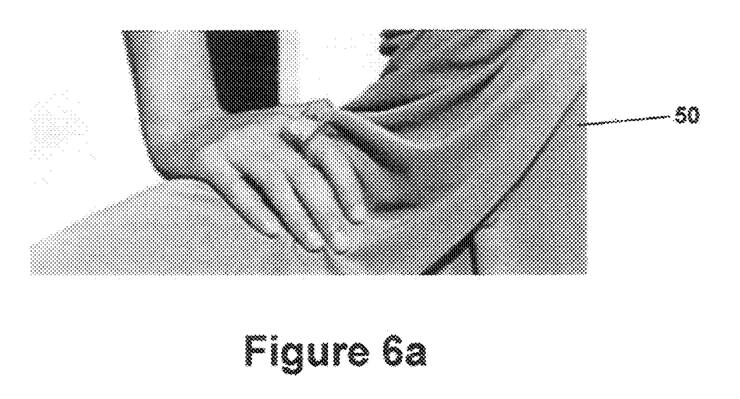
FIG. 6*a* is a two-dimensional image of a three-dimensional object for which a photo-realistic texture mapping is to be generated.

Turning now to FIGS. 6a through 6d, there is shown an example of generating a mesh model in accordance with the presently disclosed embodiment of the invention. FIG. 6a is an example of a two-dimensional image of the three-dimensional object, for which image it is desired to generate a photorealistic texture map. In particular, in the example of FIGS. 6a-6d, it is desired to generate a texture map for the fabric 50 appearing in the image.

Figure 6B:
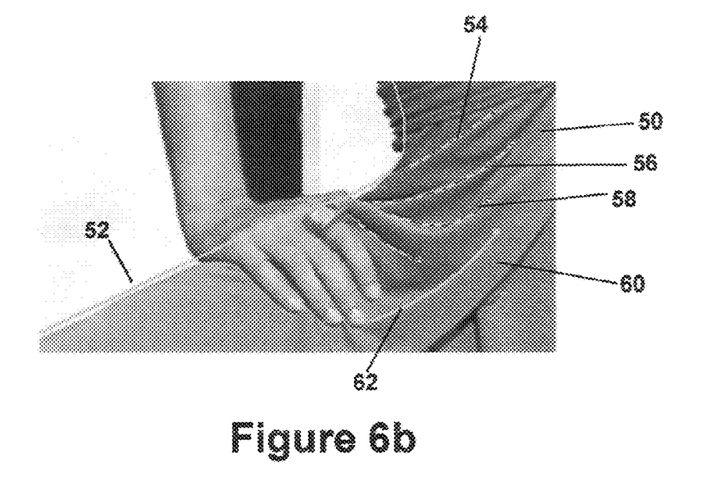
FIG. 6*b* is the image of FIG. 6*a* having user-specified texture flow lines, edge horizon lines, and texture underfold lines superimposed thereon.

FIG. 6b is the same image as FIG. 6a, showing a plurality of lines corresponding to various features of the object depicted in the image, including texture flow lines, edge horizon lines, texture underfold lines, and ridge lines, superimposed onto the image by the user. In particular, line 52 is an edge horizon line (essentially, the border of the region to be textured), lines 54, 56, and 58 are texture under-fold lines, line 60 is a texture flow line, and line 62 is a ridge line. Both ridge lines and horizon lines are examples of profile lines which have the effect of imposing a height profile along the feature center-line. In the case of an edge feature, the profile is such that the surface normals along the center-line are forced into the plane of the image, which is the characteristic of a horizon.

As noted above, the process of drawing the superimposed lines onto the image can be accomplished in various well-known manners utilizing computer user input devices such as a mouse, a digitizing tablet pen, or the like, as would be apparent to those of ordinary skill in the art. Interactive graphics systems for allowing users to manipulate graphic images displayed on a computer screen are well-known in the art, and it is believed that the particular system utilized for the purposes of practicing the present invention is of no particular consequence for the purposes of the present disclosure.

Figure 6C:
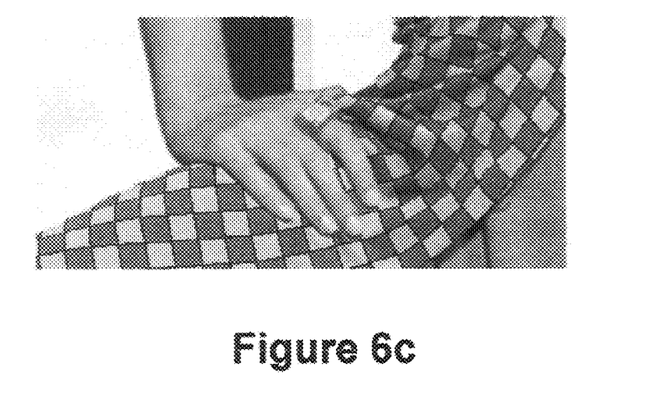
FIG. 6c is the image of FIG. 6a having a texture distribution superimposed thereon.

FIG. 6c shows the same image as FIGS. 6a and 6b, after the iterative texture distribution process described in detail above has converged to an acceptable level of error. In the example of FIG. 6c, the "texture" is a uniform grid of squares, and FIG. 6c shows this grid as it appears using a texture map developed in accordance with the teaching of the present disclosure. The distortion of the uniform grid pattern reflects the texture flow, edges, and under-folds specified by the user in FIG. 6b.

An important part of the computer program is the creation of the triangular mesh which is used to express and optimize the texture distribution. This mesh is constructed from the input feature lines and mask and is itself highly optimized in terms of its local density and its ability to accurately accommodate any user specified discontinuities, texture flows and local geometry perturbations. The algorithms used to construct this mesh form an important part of the invention.

Figure 6D:
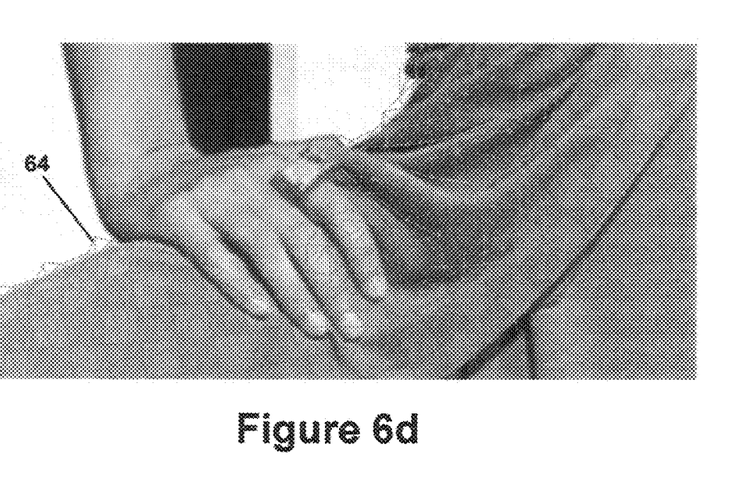
FIG. 6d is the image of FIG. 6a having a triangular mesh generated in accordance with one embodiment of the invention superimposed thereon.
Figure 7:
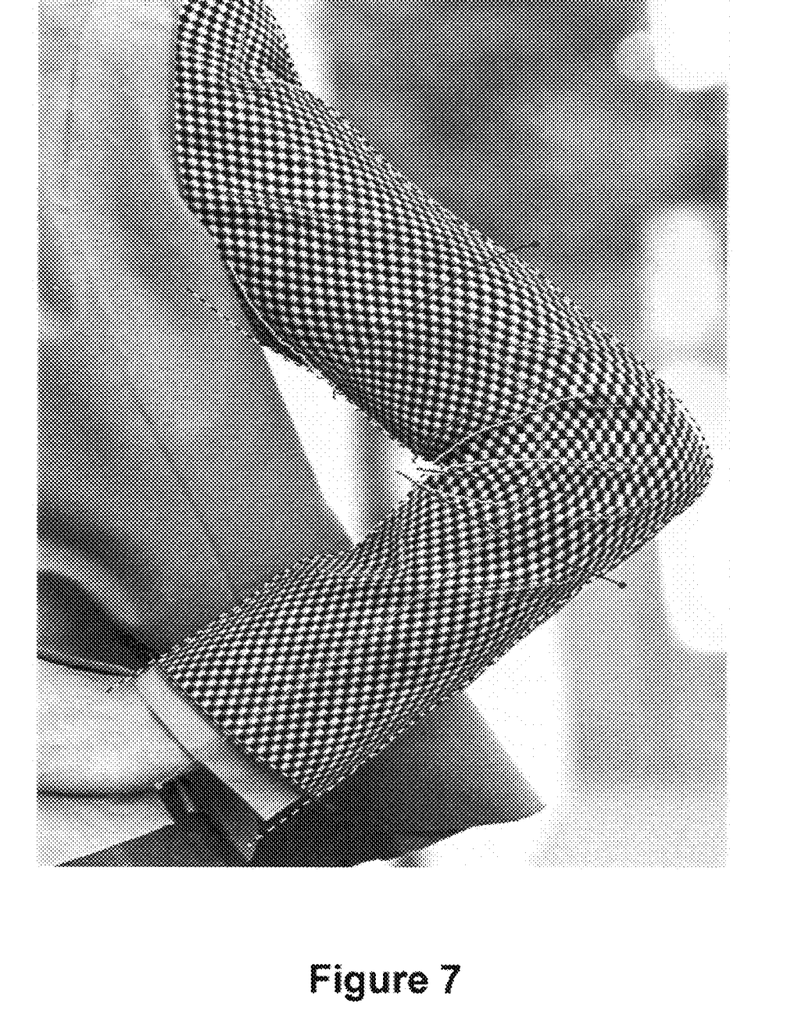
FIG. 7 is a photograph of a person wearing a garment for which a texture map has been generated in accordance with one embodiment of the invention.

FIG. 6d shows a triangular mesh 64 generated based upon the texture distribution shown in FIG. 6c using conventional triangular mesh techniques. The triangular mesh incorporates local refinements around edges and discontinuities. In accordance with one aspect of the invention, it is likely that a mesh such as that shown in FIG. 6d would likely be substantially denser than the mesh that is used as the starting point for the overall process of texture mapping. That is, in one embodiment, as part of the calculation process, a coarse mesh is initially employed. As the numeral procedure converges, the mesh is progressively refined through a process of local subdivision, increasing the density in those regions where it is most needed, i.e., in areas of the image which depict transitional features (ridges, edges, underfolds, and so on). This iterative process of mesh refinement represents a further iterative process on top of the numerical (Newton-Raphson) iterations, leading to a solution that is highly optimized in terms of quality and cost.

In one embodiment of the invention, the mesh is generated based upon estimates of an initial texture distribution in the form of a simple planar form using the average of the user defined texture flow directions. This simple estimate is distributed across an initial coarse triangular mesh. A recursive procedure is applied to each of the nodal values of the texture in turn and results in an estimate of the change required at each node in order to reduce the contribution that that node makes to the global energy function to zero. This estimate is made on the basis that all other nodal values are already optimized and that the variation of energy with texture is linear. No changes are made to any nodal values during each iteration.

Those of ordinary skill in the art will appreciate that in fact, the other nodal values are not optimized and the relationship between energy and nodal texture value is non-linear. However, the direction of the texture movement implied by the changes calculated using the previously described procedure is in general towards an improved texture distribution—where improved means having lower energy in a global sense. At the end of an iteration, the estimated nodal texture increments are therefore multiplied by some factor less than unity and applied to the existing nodal texture values. Taken as a whole then, each iteration consists of an inner Newton Raphson step applied individually to each pair of nodal texture values followed by an outer under-relaxation step applied to the entire set of nodal texture values. A value of 0.5 is found to be the optimum relaxation factor.

The described iterative procedure is applied repeatedly to a simple starting texture distribution. At various points during this iteration the rate of change of the texture distribution is determined and when this is deemed to be slowing down, an automatic mesh refinement procedure is invoked which produces a mesh having a greater degree of freedom. The texture distribution from the coarser mesh is interpolated onto this new finer mesh and the same iteration now continues on the new mesh. The process can be considered one of adaptively refining the triangular mesh so that it is able to express local texture irregularities with a minimum of increase in mesh size, and hence computational speed. The mesh refinement is based on triangle edge splitting so that a well connected mesh is maintained which guarantees to a continuous texture distribution. Both edge length and edge height interval are used as criteria for edge splitting, the latter being particularly useful for accurately modeling localized height variations such as folds and edges. The mesh refinement procedure is applied recursively.

In one embodiment the texture relaxation process runs as a background thread and at regular intervals the current texture distribution and associated mesh is used to perform a standard scan-line rendering of a reference. This rendering is combined with the illumination data for the section of image being retextured and the result is presented as an approximate retexturing. The relaxation process can be terminated at any point by the user either because it is apparent that changes to the features are needed or else because some subjective level of visual accuracy is achieved. When the user achieves some desired texture distribution, this may be saved along with the data required to reproduce or refine it. The texture distribution and its associated mesh can then be used to calculate a continuous texture map at an arbitrary resolution using standard scan-line rendering techniques. This texture map may then be used by the rendering sub-system of the authoring framework or by an associated rendering system to create a high quality re-textured rendering of the original photograph as originally required.

Figure 8:
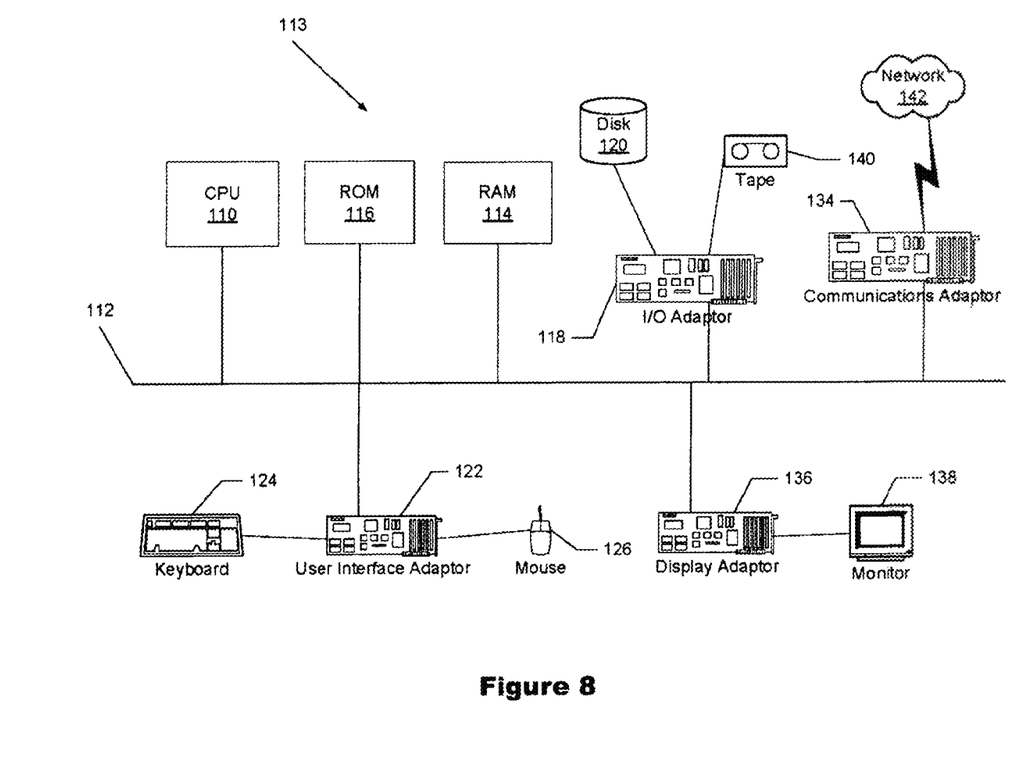
FIG. 8 is a simplified block diagram of a computer system embodying the method in accordance with the present invention.

A representative hardware environment for practicing the present invention is depicted with reference to FIG. 8, which illustrates a hardware configuration of a data processing system 113 in accordance with the subject invention. The data processing system 113 includes a central processing unit (CPU) 110, such as a conventional microprocessor, and a number of other units interconnected via a system bus 112. The data processing system 113 includes a non-transitory computer readable storage medium such as a random access memory (RAM) 114 and a read only memory (ROM) 116. Also included are an I/O adapter 118 for connecting peripheral devices such as disk units 120 and tape drives 140 to the bus 112, a user interface adapter 122 for connecting a keyboard 124, a mouse 126 and/or other user interface devices such as a touch screen device (not shown) to the bus 112, a communication adapter 134 for connecting the data processing system 113 to a data processing network 142, and a display adapter 136 for connecting the bus 112 to a display device 138. The CPU 110 may include other circuitry not shown herein, which will include circuitry found within a microprocessor, e.g. execution unit, bus interface unit, arithmetic logic unit (ALU), etc. The CPU 110 may also reside on a single integrated circuit (IC).

Although specific embodiments and implementation alternatives have been disclosed herein, this has been done solely for the purposes of describing the invention in its various aspects, and is not intended to be limiting with the scope of the invention as defined in the claims, which follow. It is contemplated that various substitutions, alterations, and/or modifications, including but not limited to those which may have been discussed or suggested herein, may be made to the disclosed embodiment(s) without departing from the spirit and scope of the invention.

What is claimed is:

1. A computer-implemented method for creating a revised texture map for a three-dimensional surface depicted in a two-dimensional photographic image, the method comprising:
    receiving a mask defining a selected region of a two-dimensional photographic image for which a revised texture map is to be generated;
    identifying at least one user-specified texture underfold constraint by receiving input from a user-input device to superimpose a first free-form line on the selected region of the image, wherein the first free-form line substantially corresponds to a location of an underfold in the image;
    receiving a cross-sectional profile associated with the at least one user-specified texture underfold constraint;
    creating a three-dimensional triangular mesh corresponding to the selected region of the image, wherein the first free-form line is preserved along edges within the triangular mesh;
    computing a weighted energy functional for the triangular mesh, the weighted energy functional comprising a plurality of nodal texture values from which the triangular mesh is specified, the nodal texture values computed in accordance with the at least one user-specified texture underfold constraint;
    re-computing, by one or more processors, the nodal texture values to converge the weighted energy functional toward a minimum value that corresponds to a distortion metric associated with the revised texture map;
    generating the revised texture map using the recomputed nodal texture values of the triangular mesh, wherein as a result of the re-computing, the revised texture map contains the underfold, thereby resulting in a connected discontinuity on the revised texture map along the first free-form line, wherein a position of the connected discontinuity is defined by the first free-form line of the user-specified texture underfold constraint and wherein a cross-sectional profile of the connected discontinuity corresponds to the received cross-sectional profile; and
    applying the revised texture map to the selected region of the two-dimensional photographic image so as to produce a modified two-dimensional photographic image having a two-dimensional representation of the revised texture map.

2. The method of claim 1, wherein the distortion metric corresponds to stretching of the revised texture map.

3. The method of claim 1, further comprising converting the first free-form line to a cubic Bézier spline defined by a user-definable accuracy criterion, such that the edges of the triangular mesh confirm to the Bézier spline.

4. The method of claim 1, further comprising scaling the revised texture map before applying it to the selected region of the two-dimensional photographic image, wherein scaling causes the revised texture map to conform to a textured item outside the selected region.

5. The method of claim 1, further comprising offsetting the revised texture map before applying it to the selected region of the two-dimensional photographic image, wherein offsetting causes the revised texture map to align with a textured item outside the selected region.

6. A computer-implemented method for creating a revised texture map for a three-dimensional surface depicted in a two-dimensional photographic image, the method comprising:
    receiving a mask defining a selected region of a two-dimensional photographic image that depicts a three-dimensional surface having an appearance defined by an initial texture map;
    receiving a user-specified texture constraint as defined by input from a user-input device to superimpose a first free-form line on the selected region of the image;
    creating a three-dimensional triangular mesh corresponding to the selected region of the image, wherein the first free-form line is preserved along edges within the triangular mesh;
    computing a weighted energy functional that approximates a total strain energy for the triangular mesh, the weighted energy functional comprising a plurality of nodal texture values computed in accordance with the user-specified texture constraint;
    iteratively re-computing the nodal texture values to converge the weighted energy functional toward a minimum strain energy value;
    generating a revised texture map for the three-dimensional surface depicted in the image, wherein the revised texture map includes the user-specified texture constraint; and
    generating a modified two-dimensional image that depicts the three-dimensional surface having the revised texture map applied thereto.

7. The method of claim 6, wherein:
    the three-dimensional surface is defined by a first fabric appearance having the user-specified texture constraint formed therein; and
    the modified two-dimensional image depicts the three-dimensional surface defined by a second fabric appearance having the user-specified texture constraint formed therein.

8. The method of claim 6, wherein the user-specified texture constraint defines a texture flow constraint.

9. The method of claim 6, wherein the user-specified texture constraint defines first and second texture flow constraints that are orthogonal to each other.

10. The method of claim 6, wherein the user-specified texture constraint defines a texture discontinuity.

11. The method of claim 6, wherein the user-specified texture constraint defines a texture underfold.

12. The method of claim 6, wherein the user-specified texture constraint defines a texture height profile constraint.

13. The method of claim 6, wherein:
    the user-specified texture constraint defines a texture flow constraint, a texture discontinuity, a texture underfold, and a texture height profile constraint; and
    iteratively re-computing the nodal texture values comprises simultaneously converging the weighted energy functional toward a minimum strain energy value generated by each of the texture flow constraint, the texture discontinuity, the texture underfold, and the texture height profile constraint.

14. The method of claim 6, wherein iteratively re-computing the nodal texture values comprises modifying the three-dimensional triangular mesh to have a larger quantity of nodal texture values.

15. The method of claim 6, further comprising receiving a plurality of user-specified texture constraints, wherein the three-dimensional triangular mesh is initially created based on an initial texture distribution derived from a planar form using an average of the plurality of user-specified texture constraints.

16. The method of claim 6, wherein the three-dimensional triangular mesh is modified to have a larger quantity of nodal texture values in response to detecting that a rate of change corresponding to a difference between the initial texture map and the revised texture map has decreased below a threshold value.

17. A computer program product tangibly embodied in a non-transitory computer-readable storage medium and comprising instructions that, when executed by a processor, perform operations for creating a revised texture map for a three-dimensional surface depicted in a two-dimensional photographic image, the operations comprising:
- receiving a mask defining a selected region of a two-dimensional photographic image that depicts a three-dimensional surface having an appearance defined by an initial texture map;
- receiving a user-specified texture constraint as defined by input from a user-input device to superimpose a first free-form line on the selected region of the image;
- creating a three-dimensional triangular mesh corresponding to the selected region of the image, wherein the first free-form line is preserved along edges within the triangular mesh;
- computing a weighted energy functional that approximates a total strain energy for the triangular mesh, the weighted energy functional comprising a plurality of nodal texture values computed in accordance with the user-specified texture constraint;
- iteratively re-computing the nodal texture values to converge the weighted energy functional toward a minimum strain energy value;
- generating a revised texture map for the three-dimensional surface depicted in the image, wherein the revised texture map includes the user-specified texture constraint; and
- generating a modified two-dimensional image that depicts the three-dimensional surface having the revised texture map applied thereto.

18. The computer program product of claim 17, wherein the user-specified texture constraint defines a texture flow constraint, a texture discontinuity, a texture underfold, and a texture height profile constraint; and
iteratively re-computing the nodal texture values comprises simultaneously converging the weighted energy functional toward a minimum strain energy value generated by each of the texture flow constraint, the texture discontinuity, the texture underfold, and the texture height profile constraint.

19. The computer program product of claim 17, wherein:
the operations further comprise receiving a plurality of user-specified texture constraints; and
the three-dimensional triangular mesh is initially created based on an initial texture distribution derived from a planar form using an average of the plurality of user-specified texture constraints.

20. The computer program product of claim 17, wherein the operations further comprise converting the first free-form line to a cubic Bézier spline defined by a user-definable accuracy criterion, such that the edges of the triangular mesh confirm to the Bézier spline.

* * * * *